United States Patent
Balding

(10) Patent No.: US 10,458,290 B2
(45) Date of Patent: Oct. 29, 2019

(54) LOW AXIAL LENGTH HIGH TORQUE SHAFT PHASING DEVICE WITH SPEED REDUCTION

(71) Applicant: GM Global Technology Operations LLC, Detroit, MI (US)

(72) Inventor: Andrew G. Balding, Wixom, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 103 days.

(21) Appl. No.: 15/661,838

(22) Filed: Jul. 27, 2017

(65) Prior Publication Data

US 2019/0032522 A1 Jan. 31, 2019

(51) Int. Cl.
    *F01L 1/352* (2006.01)
    *F16H 25/20* (2006.01)
    *F16H 37/12* (2006.01)

(52) U.S. Cl.
    CPC .............. *F01L 1/352* (2013.01); *F16H 25/20* (2013.01); *F16H 37/12* (2013.01); *F01L 2820/032* (2013.01); *F16H 2025/2043* (2013.01)

(58) Field of Classification Search
CPC . F01L 1/352; F01L 1/022; F01L 1/024; F01L 1/34; F01L 1/344; F01L 2820/032; F16H 25/20; F16H 37/12; F16H 2025/2043; F16H 35/008; F16H 2001/323
See application file for complete search history.

(56) References Cited

U.S. PATENT DOCUMENTS

| | | | |
|---|---|---|---|
| 1,901,263 A | 3/1933 | Ruud | |
| 4,517,931 A | 5/1985 | Nelson | |
| 6,615,773 B2 | 9/2003 | Moteki et al. | |
| 6,691,655 B2 | 2/2004 | Aoyama et al. | |
| 2009/0241910 A1* | 10/2009 | Shin | F02B 75/048 123/48 B |
| 2015/0345345 A1* | 12/2015 | Showalter | F01L 1/34 123/90.11 |
| 2015/0375809 A1* | 12/2015 | Yuasa | B62D 35/007 296/180.1 |

* cited by examiner

*Primary Examiner* — Jacob S. Scott
*Assistant Examiner* — Lori Wu
(74) *Attorney, Agent, or Firm* — Harness, Dickey & Pierce, P.L.C.

(57) ABSTRACT

The phasing device for phasing a trunnion assembly of an internal combustion engine includes a rotary input member and a planetary gear assembly having a sun gear connected to the rotary input member, a ring gear connected to an actuator device and a planetary carrier connected to a rotary output member.

5 Claims, 2 Drawing Sheets

LOW AXIAL LENGTH HIGH TORQUE SHAFT PHASING DEVICE WITH SPEED REDUCTION

FIELD

The present disclosure relates to a low axial length high torque shaft phasing device with speed reduction.

BACKGROUND

This section provides background information related to the present disclosure which is not necessarily prior art.

Internal combustion engines utilize various components for varying engine operations based upon operating conditions. For example, engines can use camshafts with a cam phaser for altering the rotational position of the cam based upon engine operating conditions. Internal combustion engines have also been provided with variable compression ratios for varying the compression stroke of the pistons based upon engine operating conditions. These engines can further utilize a phasing device for altering the rotary position of a control shaft based upon engine operating conditions. It is desirable to provide an improved shaft phasing device with a low axial length and speed reduction.

SUMMARY

This section provides a general summary of the disclosure, and is not a comprehensive disclosure of its full scope or all of its features.

The phasing device includes a rotary input member and a planetary gear assembly having a sun gear connected to the rotary input member, a ring gear connected to a rotary member and a planetary carrier connected to an actuator device. According to one aspect of the present disclosure, the actuator device is disposed laterally to a side of the planetary gear assembly within an axial length of the planetary gear assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
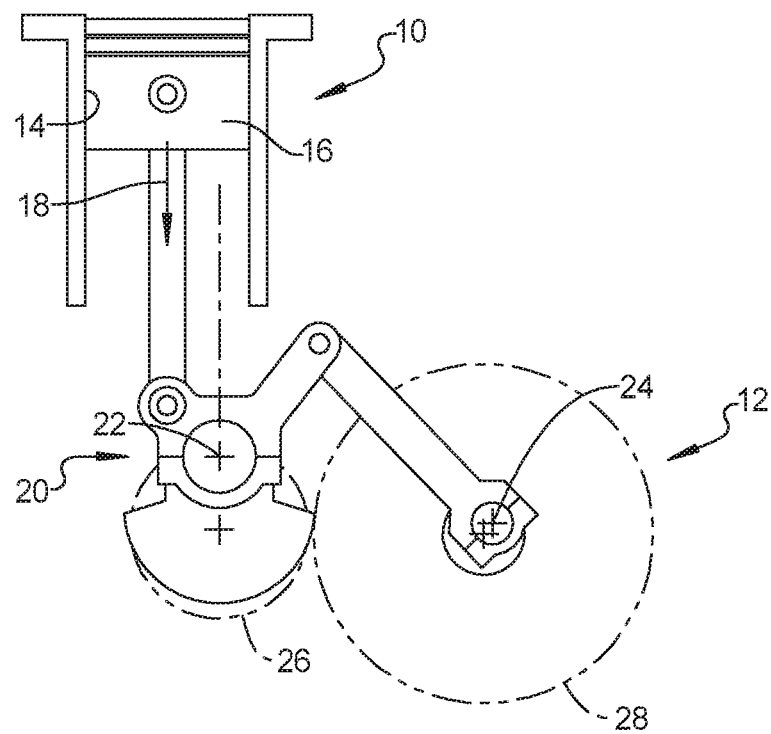
FIG. 1 is a schematic view of an internal combustion engine having a shaft phasing device according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exemplary internal combustion engine 10 is shown including a phasing device 12 according to the principles of the present disclosure. The internal combustion engine 10 includes a plurality of cylinders 14 that receive a plurality of pistons 16. The pistons 16 are connected to a connecting rod 18 that are connected to a trunnion assembly 20 that is connected to a crankshaft 22 and a control shaft 24. The crankshaft 22 and the control shaft 24 can be joined for mutual rotation by intermeshing gears 26, 28.

Figure 2:
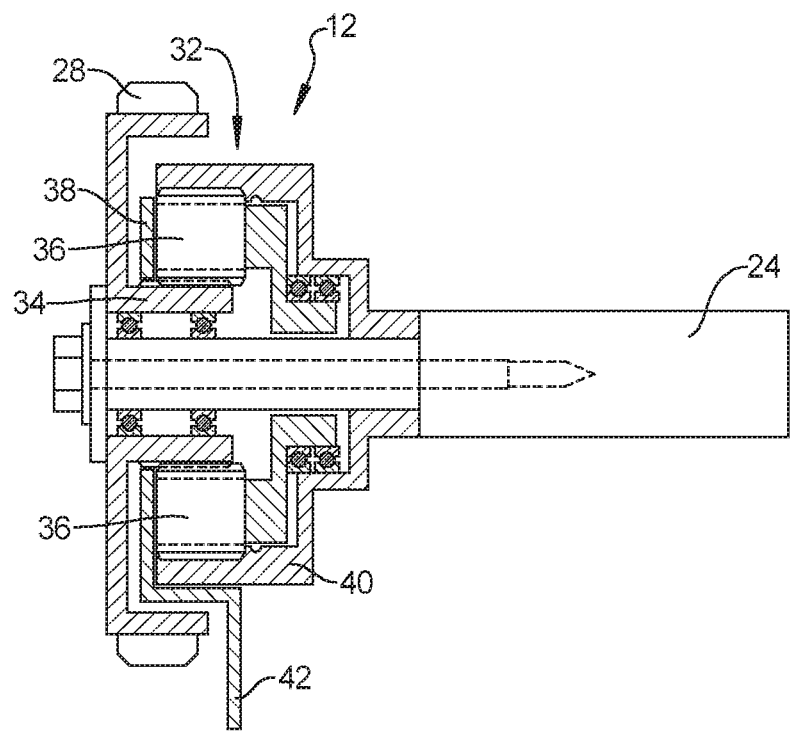
FIG. 2 is a schematic view of the shaft phasing device according to the principles of present disclosure.

As shown in FIG. 2, the gear 28 is drivingly connected to the control shaft 24 via the phasing device 12. The phasing device 12 includes a planetary gear assembly 32 having a sun gear 34 connected to the gear 28. A plurality of planet gears 36 are supported by a planetary carrier 38 and are in meshing engagement with the sun gear 34. A ring gear 40 is in meshing engagement with the planet gears 36 and is connected to the control shaft 24. The planetary gear assembly 32 can provide a desired gear reduction between the crankshaft 22 and the control shaft 24. An actuator arm 42 is connected to the planetary carrier 38.

Figure 3:
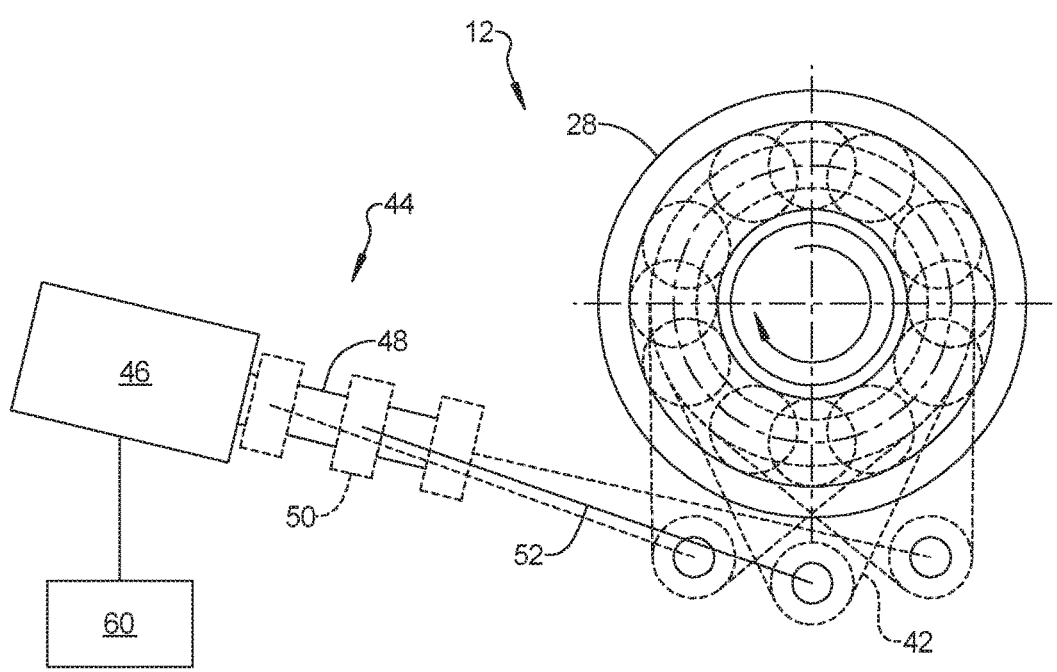
FIG. 3 is a cross-sectional view of the shaft phasing device according to the principles of the present disclosure.

As shown in FIG. 3, an actuator device 44 is connected to the actuator arm 42. The actuator device 44 can include an actuator motor 46 which drives an actuator worm 48 to drive a nut 50. An actuator link 52 is connected between the nut 50 and the actuator arm 42. Although the actuator device 44 is shown including a worm and nut drive system 48/50, other actuator devices can be utilized. As shown in FIG. 3, the actuator device 44 can be activated between a neutral, a fully extended and a fully retracted positions. The planetary carrier is usually stationary during operation. The movement of the actuator arm 42 alters the phasing of the control shaft 24. Power is transmitted from the sun gear 34 to the ring gear 40 by means of the planetary gears 36. A controller 60 controls the actuator device 44 for phasing the control shaft 24 to either advance or retard the rotation of the control shaft 24 by controlling the position of the planet carrier 38.

The actuator device 44 provides shaft angular phasing in a low axial length. In particular, the sun gear 34, the ring gear 40 and the planetary carrier 38 each rotate about a common axis and an axial length of the planetary gear assembly 32 is along the common axis. The actuator device 44 is disposed laterally to a side of the planetary gear assembly 32 and within the axial length of the planetary gear assembly 32. The phasing device as established in the industry require high axial length to accommodate the actuating device which use either hydraulic solenoid or electrical actuation. The present disclosure enables a compact package that also provides speed reduction.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An internal combustion engine phasing system, comprising:
an engine structure including a plurality of cylinders;
a plurality of pistons each disposed in a corresponding one of the plurality of cylinders;
a plurality of connecting rods each connected to a corresponding one of the plurality of cylinders;
a plurality of trunnion assemblies each including a first portion connected to the corresponding one of the plurality of connecting rods and each being disposed on a crankshaft; and
a phasing device, comprising:
a rotary input gear drivingly engaged with an output gear of the crankshaft;
a planetary gear assembly having a sun gear defining a first rotary component connected for rotation with the rotary input gear, a second rotary component connected to an actuator device including an actuator motor drivingly connected to a drive mechanism for activating an actuator link, and a third rotary component connected to a control shaft, the control shaft being drivingly connected to a second portion of the trunnion assemblies, wherein the actuator device is disposed laterally to a side of the planetary gear assembly and the planetary gear assembly has an axial length defined by an entire length of each of the first rotary component, the second rotary component and the third rotary component wherein the actuator device is disposed within the axial length.

2. The internal combustion engine phasing system according to claim 1, wherein the second rotary component is a planetary carrier.

3. The internal combustion engine phasing system according to claim 2, wherein the third rotary component is a ring gear.

4. An internal combustion engine phasing system, comprising:
an engine structure including a plurality of cylinders;
a plurality of pistons each disposed in a corresponding one of the plurality of cylinders;
a plurality of connecting rods each connected to a corresponding one of the plurality of cylinders;
a plurality of trunnion assemblies each including a first portion connected to the corresponding one of the plurality of connecting rods and each being disposed on a crankshaft; and
a phasing device, comprising:
a rotary input gear drivingly engaged with an output gear of the crankshaft;
a planetary gear assembly having a first rotary component connected for rotation with the rotary input gear, a second rotary component connected to an actuator device including an actuator motor drivingly connected to a drive mechanism for activating an actuator link, and a third rotary component connected to a control shaft, the control shaft being drivingly connected to a second portion of the trunnion assemblies, wherein the actuator device is disposed laterally to a side of the planetary gear assembly and the planetary gear assembly has an axial length defined by an entire length of each of the first rotary component, the second rotary component and the third rotary component wherein the actuator device is disposed within the axial length, wherein the first rotary component, the second rotary component, and the third rotary component each rotate about a common axis and the axial length of the planetary gear assembly is along the common axis, wherein the third rotary component is a ring gear.

5. An internal combustion engine phasing system, comprising:
- an engine structure including a plurality of cylinders;
- a plurality of pistons each disposed in a corresponding one of the plurality of cylinders;
- a plurality of connecting rods each connected to a corresponding one of the plurality of cylinders;
- a plurality of trunnion assemblies each including a first portion connected to the corresponding one of the plurality of connecting rods and each being disposed on a crankshaft; and
- a phasing device, comprising:
  - a rotary input gear drivingly engaged with an output gear of the crankshaft;
  - a planetary gear assembly having a first rotary component connected for rotation with the rotary input gear, a second rotary component connected to an actuator device including an actuator motor drivingly connected to a drive mechanism for activating an actuator link, and a third rotary component connected to a control shaft, the control shaft being drivingly connected to a second portion of the trunnion assemblies, wherein the actuator device includes the actuator motor drivingly connected to the drive mechanism which includes a leadscrew and a nut axially movable along the leadscrew in response to rotation of the leadscrew and the actuator link connected to the nut and the second rotary component, wherein the third rotary component is a ring gear.

* * * * *